United States Patent [19]
Knox

[11] 3,861,717
[45] Jan. 21, 1975

[54] SWAY CONTROL FOR TOWED VEHICLES HAVING VARIABLE CONTROL FEATURE

[76] Inventor: Howard W. Knox, 8713 Rushmore Dr., Knoxville, Tenn. 37919

[22] Filed: Oct. 1, 1973

[21] Appl. No.: 402,359

[52] U.S. Cl................ 280/446 B, 188/67, 188/365
[51] Int. Cl................................................. B60d 1/06
[58] Field of Search............ 280/446 B; 188/365, 67

[56] References Cited
UNITED STATES PATENTS

| | | | |
|---|---|---|---|
| 2,115,551 | 4/1938 | Farmer | 188/365 |
| 2,775,869 | 1/1957 | Pointer | 188/67 UX |
| 3,253,854 | 5/1966 | Hollander | 188/67 X |
| 3,294,421 | 12/1966 | Mathisen | 280/446 B |

FOREIGN PATENTS OR APPLICATIONS 1,490,600   6/1967   France .............. 280/446 B Primary Examiner—Leo Friaglia
Attorney, Agent, or Firm—Fitch, Even, Tabin & Luedeka

[57] ABSTRACT

Apparatus for controlling the pivotal movement of a trailer about its hitch point to its tow vehicle including at least one arm interconnecting the trailer and tow vehicle at a location laterally of the hitch point. The arm includes at least first and second elongated telescoping sections, at least one of which is hollow, friction shoes disposed within the first hollow telescoping section and engaging that part of the second section that is disposed within the first section, expandable means adapted to urge the friction shoes into frictional engagement with the second telescoping section. Means is provided for controlling the expansion of the expandable means to select the degree of resistance to telescopic movement of the sections and thereby establish a desired degree of resistance to pivotal movement, i.e. sway, of the trailer with respect to its tow vehicle.

8 Claims, 11 Drawing Figures

SWAY CONTROL FOR TOWED VEHICLES HAVING VARIABLE CONTROL FEATURE

This invention relates to interconnections between a tow vehicle and a towed vehicle, e.g. a trailer, and particularly to apparatus for remotely controlling pivotal movement of a trailer about an upright axis coincident with the hitch point between the trailer and its tow vehicle.

In towing trailers it is a common danger that the trailer which is connected to the tow vehicle at a pivot point such as the common trailer hitch, will uncontrollably pivot about an upright axis coincident with the trailer hitch. Such relative motion between the trailer and the tow vehicle can cause the forward direction of the tow vehicle to be diverted in the manner referred to at times as "jackknifing". Uncontrolled angular movement between the tow vehicle and the trailer can occur on the open road by reason of wind currents, either natural or artificially generated as by the passing of a larger vehicle, that physically force the trailer to sway. It is well recognized that this swaying motion becomes cumulative and unless checked will eventually result in jackknifing, overturning, or otherwise loss of control of the vehicles.

It long has been recognized that there are driving situations which require different degrees of resistance to lateral motion of the trailer relative to the tow vehicle. Such situations include open road driving where there normally is relatively small angular motion between tow vehicle and trailer but where there are high speeds and relatively strong wind currents that dicate a high degree of resistance to jackknifing. On the other hand, in short radius turns and/or in parking trailers it is desired at times that there be minimal resistance to pivotal action so that the trailer can be maneuvered as desired.

The prior art has sought to prevent uncontrolled angular motion between a tow vehicle and a trialer by the use of restraints of fixed rigidity connected between the tow vehicle and the trailer at locations laterally of a central trailer hitch. One particular device of this type is shown in U.S. Pat. No. 3,612,575 issued Oct. 12, 1971. This and similar rigid lateral interconnections between the trailer and tow vehicle are not suitable in that they cannot accommodate the different driving and turning situations which require different degrees of restraint in different driving situations.

A further type of lateral interconnection, such as that shown in U.S. Pat. No. 3,502,351 issued Mar. 24, 1970, provides a feature which permits the rigidity of each interconnection to be selected. The adjustment is manual and once selected, it can only be changed by manipulations at the interconnection, requiring either the operator or an assistant to move to the interconnection to make the change. Obviously, changes are not possible when vehicles are underway.

U.S. Pat. No. 2,202,658 shows lateral interconnections between a trialer and its tow vehicle which are said to rigidify the trailer with respect to its tow vehicle. Each of the interconnections of this patent includes a piston-cylinder device, with the movement of the piston within the cylinder being either free, i.e., no pivotal restraint, or stopped dead, i.e. complete pivotal restraint, by valving the flow of a hydraulic fluid between the ends of the cylinder on opposite sides of the piston. The selection of either no restraint or complete restraint is said to be accomplished from the tow vehicle by pulling on a wire that closes a normally open valve to stop the transfer of hydraulic fluid between the cylinder ends and stopping the piston dead within the cylinder. There is no provision for intermediate restraint in this device.

Sway control devices in the prior art, therefore, have provided either too little or too much rigidity of the lateral interconnections, hence too little or too much resistance to jackknifing so that they are not effective for the normal variations in towing circumstances.

It is an object of the present invention to provide an improved sway control apparatus for towed vehicles. It is another object to provide sway control apparatus in which the degree of control is infinitely adjustable. It is another object to provide sway control apparatus in which the degree of control is selectable from a location remote from the location of the interconnection between the trailer and the tow vehicle.

Other objects and advantages of the invention will be recognized from the following description, including the drawings in which.

Figure 10:
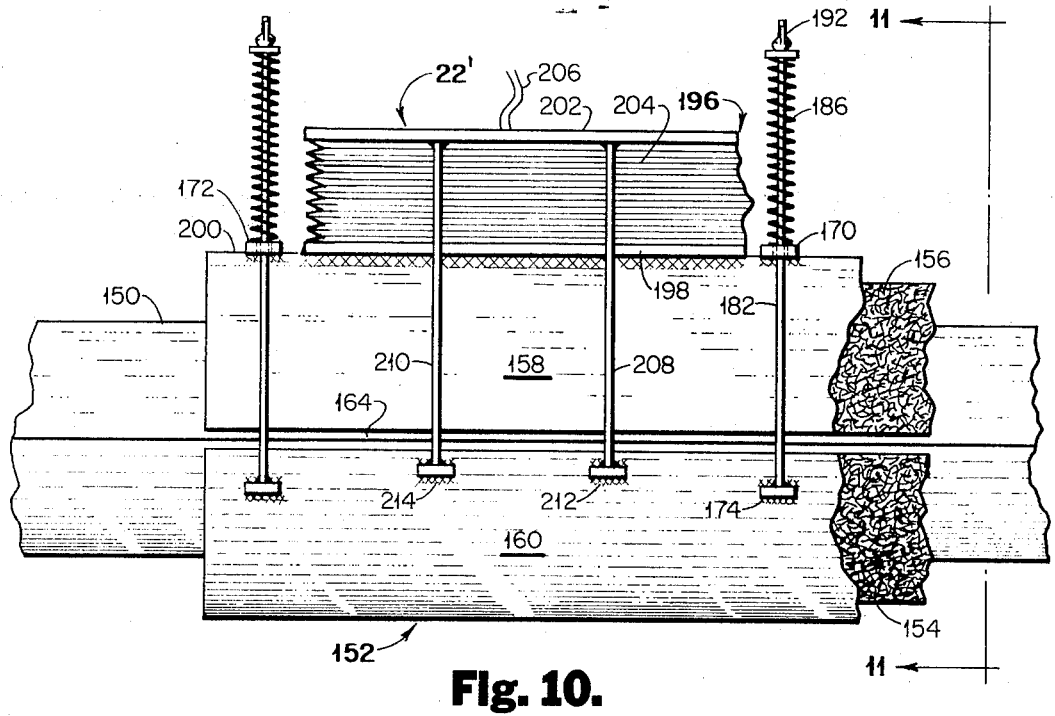
Figure 11:
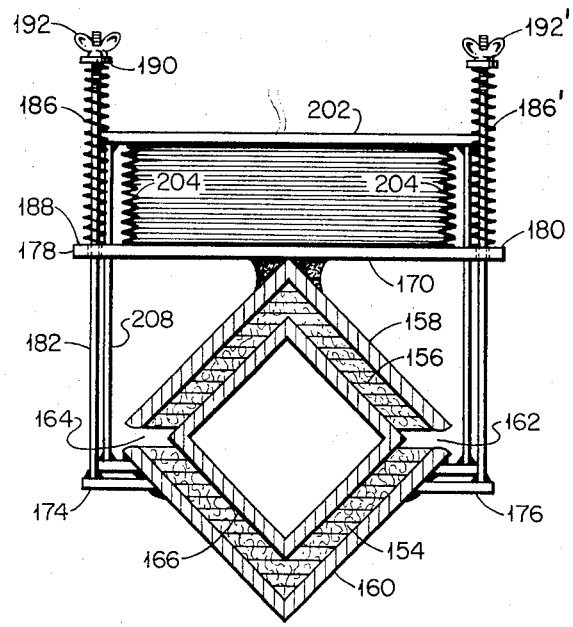

FIG. 10 is a side elevation view, partly fragmentary, of a further embodiment of apparatus embodying various features of the invention; and FIG. 11 is a sectional view taken along the line 11—11 of FIG. 10. Stated briefly, the invention disclosed herein comprises at least one extensible arm connected at one of its ends to a trailer and at its opposite end to a tow vehicle at locations laterally of a generally central hitch point between the vehicles. The arm includes at least first and second telescoping sections whose extensibility is controlled by adjustment of friction means disposed within the first telescoping section and engaging that part of the second section that is disposed within the first section, and means adapted to urge the friction means into frictional engagement with the second telescoping section. Means is provided for controlling the means which acts upon the friction means to select the degree of resistance to telescopic movement of the sections and thereby establish a desired degree of resistance to pivotal movement, e.g., sway, of the trailer with respect to the tow vehicle.

Figure 1:
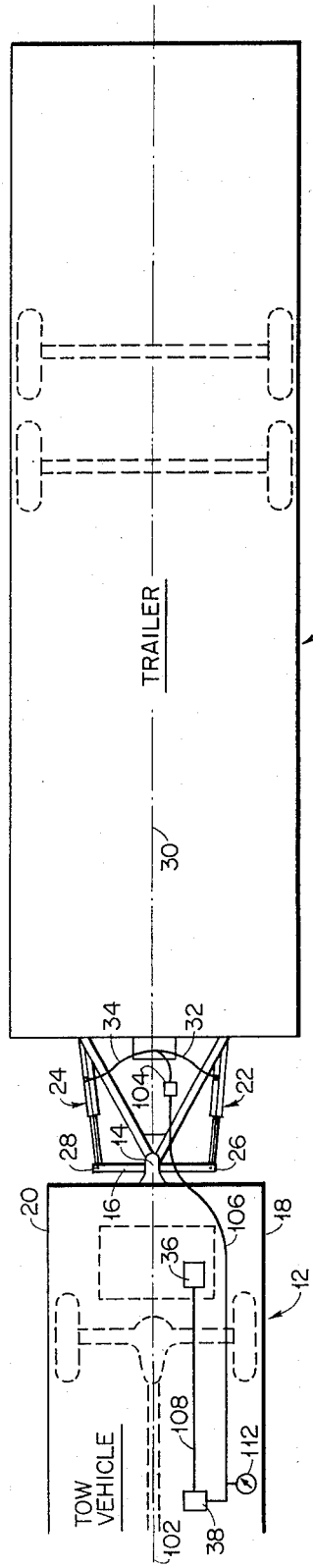
FIG. 1 is a fragmentary top view representation of a trialer and its tow vehicle and showing an interconnection therebetween depicting various features of the invention.

With reference to FIG. 1, there is shown a trailer 10 hitched to a tow vehicle 12 by means of a common ball and socket type trailer hitch 14. In the depicted embodiment, the hitch 14 is provided with a cross arm 16 fixedly secured, as by welding, to the hitch and extending laterally from opposite sides thereof by a substantial distance but not extending beyond the sides 18 and 20 of the tow vehicle 12. Extensible arms 22 and 24 interconnect the opposite ends 26 and 28 of the cross arm 16 to the trailer 10 at locations disposed laterally of the longitudinal centerline 30 of the trailer. Conduits 32 and 34 lead from the arms 22 and 24, respectively, to a source of pressurized fluid 36. A control unit 38 controls the flow of fluid through the conduits to the arms 22 and 24.

The arms 22 and 24 are substantially identical so that a description of one suffices for an understanding of the other. It is to be recognized that a single arm interconnecting the trailer to its tow vehicle will suffice in certain situations to adequately control trailer sway, but it is preferred to use one arm on each side of the hitch point, to better control sway. Further, when two arms are used, the anti-pivotal forces are in opposing directions so that the ball hitch is not subjected to extraordinary strees.

Figure 3:
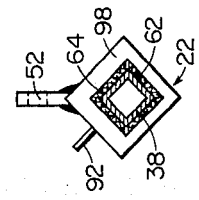
FIG. 3 is a sectional view taken along line 3—3 of FIG. 2 (omitting the fragmentary portions of the trailer)
Figure 2:
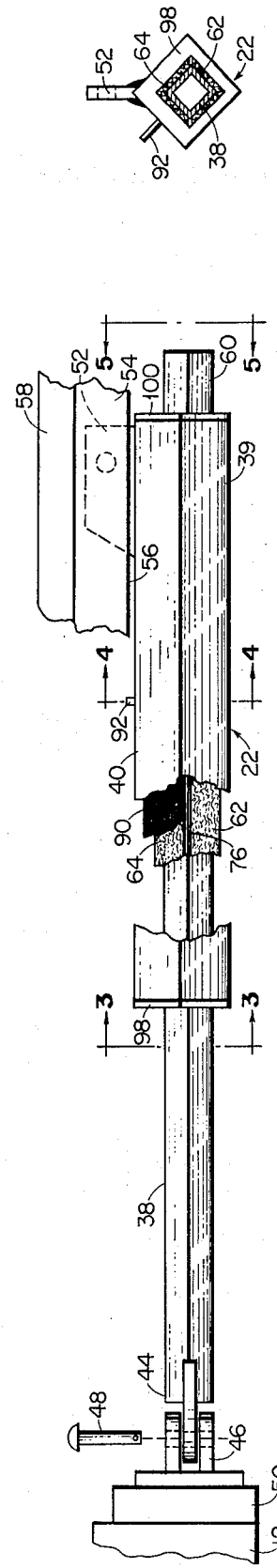
FIG. 2 is a side view, partly cutaway, of an extensible arm for interconnecting a trailer and its tow vehicle.
Figure 4:
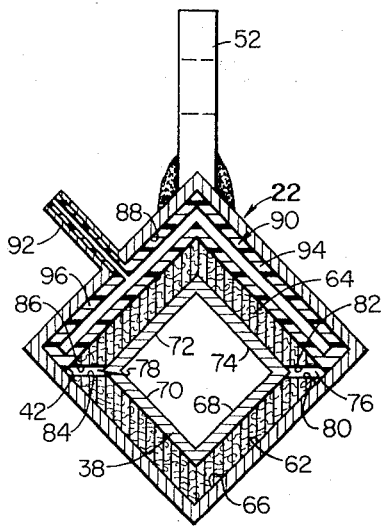
FIG. 4 is a sectional view taken along line 4—4 of FIG. 2 (omitting the fragmentary portions of the trailer)

As depicted in FIG. 2, the arm 22 comprises two telescoping sections 38 and 40, each of which is square in cross section (see FIGS. 3 and 4). It is recognized that sections having other than square cross sections are acceptable for use in the arm 22. The rear section is hollow to define a bore 42 into which the forward section 38, which is of a smaller cross section than the rear section 40, is slidably received. The forward section extends through the bore 42 of the rear section 40 and by sliding the forward section 38 within the rear section, the arm 22 is made extensible. As will appear more fully hereinafter, the forward section 38 is of sufficient length to fully occupy the length of the bore 42 of the rear section even when the arm is extended to its maximum length. The term "telescoping,"therefore, is intended to cover the situation where the forward section slides within the rear section even though the forward section will at times extend beyond both ends of the rear section so that the rear section serves as a type of sleeve within which the forward section is slidably mounted. The depicted forward section 38 is hollow, but it suitably may be solid.

Figure 7:
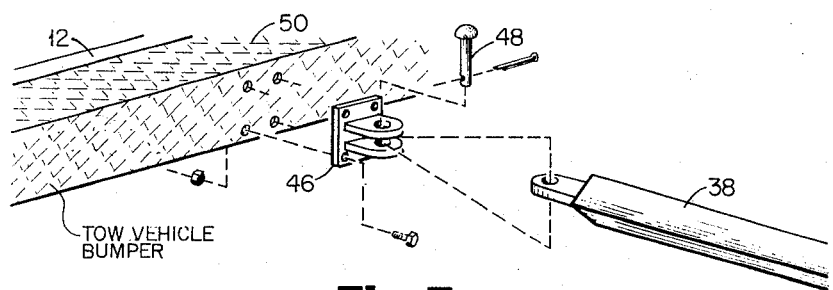
FIG. 7 is an exploded view, partly fragmentary, showing one embodiment for releasably connecting one end of the arm shown in FIG. 2 to a tow vehicle.

One end 44 of the forward section 38 of the arm 22 is removably attached to the tow vehicle 12 at a location laterally of the hitch 14. This connection is of a type which permits swinging movement of the arm 22 with respect to the tow vehicle and comprises a clevis 46 and pin 48 arrangement as depicted in FIGS. 2 and 7. The clevis 46 is shown in FIG. 7 as mounted on the bumper 50 of the tow vehicle. In those tow vehicles which eiher have no bumper or have a weak bumper, a cross arm 16 as noted above and shown in FIG. 1 provides a suitable anchorage point for the end 44 of the arm 22 to the tow vehicle 12. The same clevis and pin arrangement as shown in FIG. 2 is suitable for attaching the end of the arm 22 to the cross arm 16.

On the top side of the rearward end 39 of the rear telescoping section 40 there is provided an upstanding mounting lug 52 adapted to mate with a suitable element 54 on the trailer frame for releasably securing such end 39 of the rear section to the trailer 10. In the depicted embodiment, the lug 52 is of sufficient height to cause the rear telescoping section 40 to extend below the bottom 56 of the trailer frame 58 so that when the rear end 60 of the forward telescoping section 38 protrudes from the rear end 39 of the rear telescoping section 40, it readily clears the trailer frame when the arm is telescoped toward its minimum length, that is the minimum distance between the end attachments of the arm 22.

Figure 5:
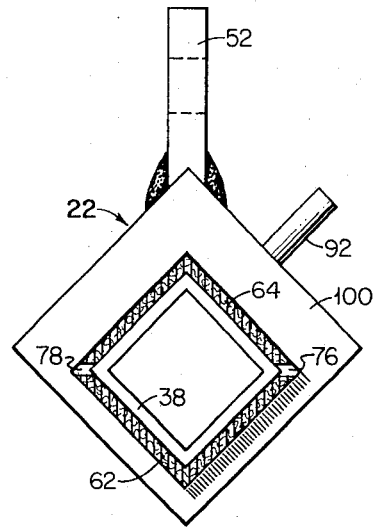
FIG. 5 is an end view of the right end of the arm shown in FIG. 2 (omitting the fragmentary portions of the trailer)

As noted, the forward telescoping section 38 is of a smaller, but like-shaped, cross section than the rear telescoping section 40. Further, the forward section is of a greater length than the rear section so that the forward section extends fully through the bore 42 of the rear section at all times, even when the arm 22 is extended to its maximum length as established by the hitch arrangement. In the embodiment depicted in FIGS. 4 & 5 the cross section of each of the telescoping sections is oriented with the diagonally opposite apices of the cross section aligned in respective mutually perpendicular horizontal and vertical planes to maximize the structural rigidity of the arm 22 and minimize the strength requirements of the expandable means as will appear more fully hereinbelow. Internally of the rear section, the forward section 38 is cradled between top and bottom friction shoes 62 and 64 each of which, as illustrated in FIG. 4, is of a V-shaped cross section and extends the full length of the bore 42 of the rear telescoping section 40. The bottom shoe is interposed between the interior wall 66 of the bore of the rear section 40 and the outer walls of the bottom panels 68 and 70 of the forward telescoping section 38 to slidably support the forward section 38 within the bore 42. The outer walls of the top panels 72 and 74 of the forward telescoping section 38 are overlayed by the second shoe 64, which also extends the full length of the bore of the rear telescoping section. Each of the shoes 62 and 64 is formed of a friction material such as is well known in the automobile brake lining industry. These shoes frictionally engage substantially all of that portion of the forward telescoping section that is disposed within the bore of the rear telescoping section. The two elongated shoes 62 and 64, however, preferably do not completely encompass the outer wall of the forward telescoping section 38, but rather there are provided elongated gaps 76 and 78 between the side edges 80 and 82 and 84 and 86, respectively, of the shoes 62 and 64 at locations disposed along the diametrically opposite side midsections of the forward telescoping section. By reason of these gaps 76 and 78 the two shoes are movable radially with respect to the encompassed portion of the forward section 38 so that their proximity to the outer wall of the forward telescoping section disposed within the bore 42 may be varied to increase or decrease the degree of frictional engagement between the shoes and the section wall to increase or decrease the restraint against telescopic movement of the two sections of the arm 22 therey determining the extensibility of the arm. The depicted shoes are each of one-piece construction in the depicted embodiment. It is acceptable, however, to use four elongated flat shoes, one disposed along each of the sides of that portion of the forward section disposed within the bore 42 of the rear section.

Figure 6:
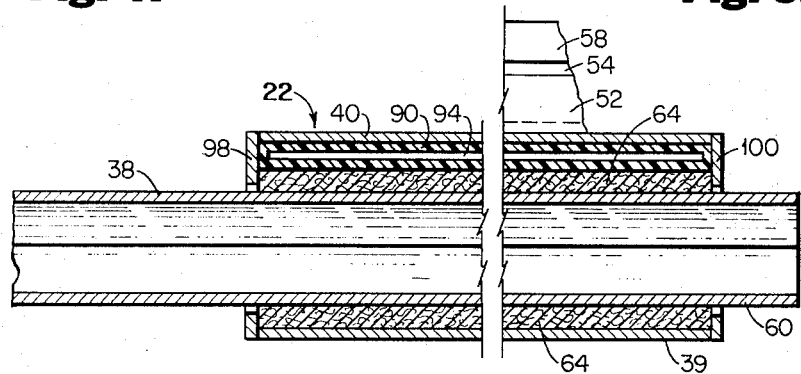
FIG. 6 is a side elevational view, in section, of the area shown in FIG. 2.

As illustrated in FIGS. 2, 4 and 6, the upper shoe 64 engaging the forward telescoping section within the bore of the rear telescoping section is separated from the top inner wall 88 of the bore 42 by a resilient expandable member 90, which in the depicted embodiment comprises an inflatable rubber bag. Conduit means 92 communicates between the interior of the bag 90 and the exterior of the arm 22 to provide a passageway through which fluid may be passed to inflate or deflate the bag 90. In the depicted embodiment the inflatable bag 90 has a V-shaped cross section and extends the full length of the bore 42 to define two elongated panel sections 94 and 96 that overlie the top friction shoe. By reason of the position of the bag 90 within the bore 42 and its shape, it is subjected to substantially no longitudinal shear forces as when the arm is called into play for restraining pivotal movement of the trailer. Further, forces exerted against the bag by vertical motion of the forward section are minimized by limiting the possible radial movement of the forward section within the bore 42. It will be recognized that the inflatable bag 90 could occupy less volume between the shoe and the bore wall if desired, such as when controlling sway of a relatively light trailer. On the other hand, the bag may be tubular so that it fully encompasses both of the shoes 62 and 64 along the full length of the bore 42. Alternatively, the expandable means may comprise a diaphragm adapted to urge the shoes against the forward section upon movement of the diaphragm.

The ends of the rear telescoping section 40 are provided with respective end plates 98 and 100, each having an opening through which the forward telescoping section 38 passes. These end plates limit radial movement between the sections and provide seals against longitudinal movement of the friction shoes 62 and 64 and the inflatable bag 90 from the bore 42 of the rear telescoping section.

Considering the foregoing description, it will be recognized that when the bag 90 is inflated it bears against the inner wall 66 of the rear telescoping section 40 and against the upper friction shoe 64 forcing the friction shoe 64 into frictional engagement with the upper panels 72 and 74 of that portion of the forward telescoping section disposed within the bore of the rear telescoping section. This action simultaneously urges the forward telescoping section 38 toward the bottom shoe 62 thereby increasing the frictional engagement beteween these latter two members. This action increases the resistance to movement of the forward telescoping section with respect to the rear telescoping section, hence increases the resistance to extension of the length of the arm 22 between its points of attachment to the trailer and tow vehicle. When the arm 22 is interconnected between a tow vehicle and a trailerat locations disposed laterally of an imaginary line extending parallel to the longitudinal axes 30 and 102 of the two vehicles and passing through the hitch point between the two vehicles, its resistance to extension determines the degree of resistance to pivotal movement of the trailer with respect to the tow vehicle. Accordingly, once the bag 90 has been expanded to the extent that it bears against the shoe to urge it toward the encompassed portion of the forward section, as by filling the bag with an incompressible fluid, an increase in the pressure of the fluid in the inflatable bag 90 serves to determine the degree of resistance to pivotal motion between the trailer and the tow vehicle and is the determining factor in setting the sway control provided by the arm 22.

As noted hereinbefore, a single arm provides satisfactory sway control for certain relatively light trailers. With heavier trailers, it is preferred to employ an arm of the type described above on each of the opposite sides of the hitch point between the trailer and its tow vehicle. Dual arms, e.g. arms 22 and 24, interconnecting the trailer and its tow vehicle on opposite sides of the hitch point provide increased sway control and more evenly distribute the stress forces incurred.

As noted above, expansion of the inflatable bag 90 serves to set the degree of sway control provided by the arm 22. Controlled expansion of the inflatable bag 90 is accomplished in the present invention by any of several suitable means. In the embodiment depicted in FIG. 1, the inflatable bag of arm 22 is connected by means of a conduit 32 to one side of a quick disconnect 104. The other side of the quick disconnect is connected to a further conduit 106 which leads from the quick disconnect to the operator's position in the tow vehicle where it is connected to a control unit 38. Pressurized fluid from a source 36, depicted in FIG. 1 as being located in the luggage compartment of the tow vehicle, is conducted by means of a conduit 108 to the control unit 38. Through operation of a valve 110 (see FIG. 8) in the control unit the operator controls the flow of pressurized fluid from the source 36 through conduit 108, the valve 110, conduit 106, and conduit 32, to the inflatable bag in arm 22. By this means the operator controls the expansion of the bag, hence controls the extensibility of the arm 22. A pressure gauge 112 is provided in conduit 106 to provide the operator with a visual indication of the degree of sway control which he is applying at any given time. As referred to hereinbefore, the resistance to extensibility of the arm 22 determines the degree resistance to pivotal movement of the trailer 10 with respect to the tow vehicle 12, hence the degree of sway control. In FIG. 1 there is depicted a second arm 24 interconnected between the trailer and the tow vehicle and on the opposite side of the hitch point from the arm 22. The inflatable bag of this second arm, which is substantially identical to the arm 22, is connected by a conduit 34 to the conduit 32 so that pressurized fluid flowing from the source 36 to one of the arms also flows to the other of the arms to provide substantially equal inflation of the respective inflatable bags of the arms. It will be noted that the location of the arms 22 and 24 is substantially symmetrical with respect to the longitudinal centerlines of the tow vehicle and the trailer so as to substantially equalize, inasmuch as is possible, the forces applied in controlling sway of the trailer when the respective inflatable bags in the arms 22 and 24 are inflated by equal amounts.

Figures 8, 9:
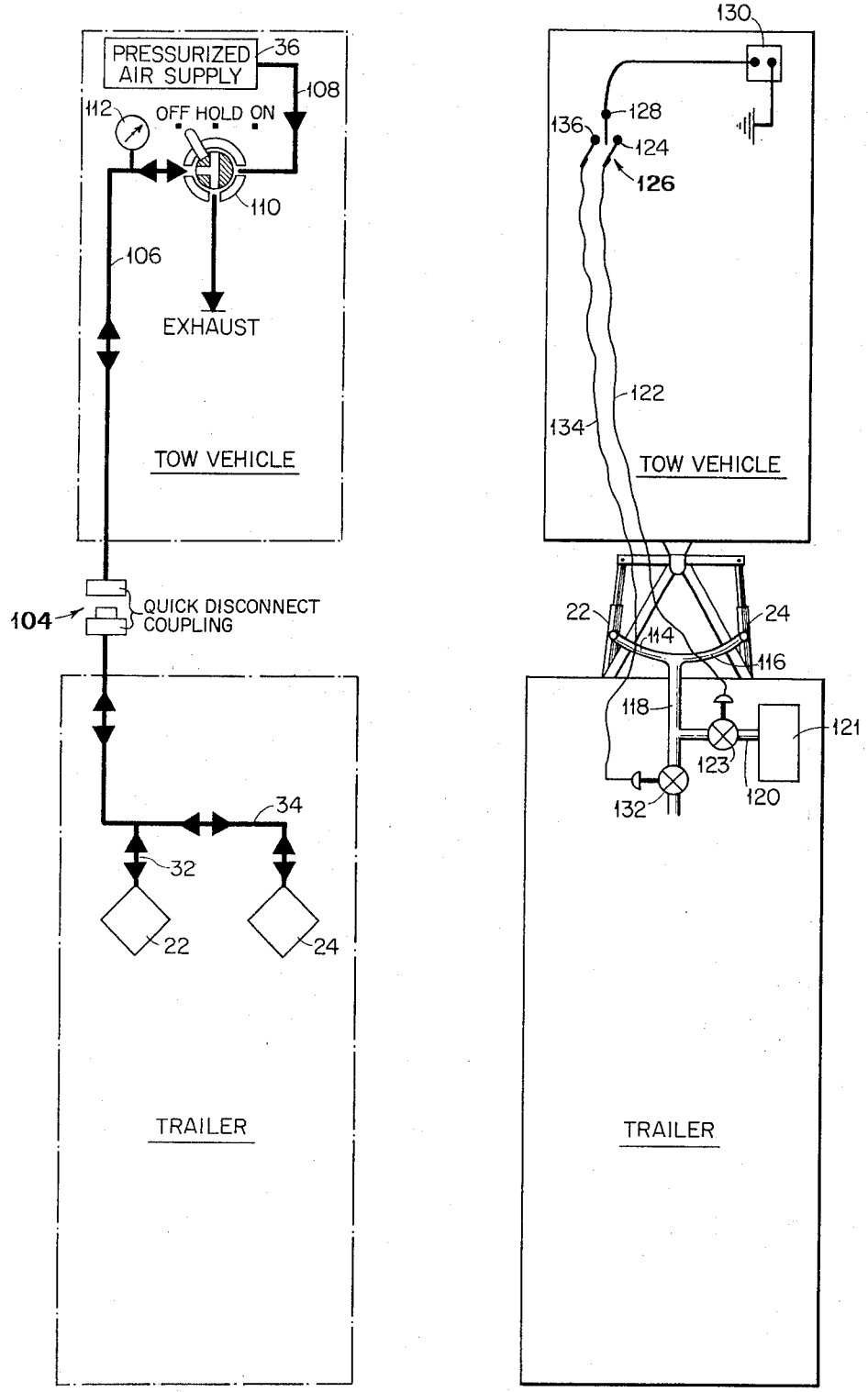
FIG. 8 is a representation of a system for controlling the extensibility of one or more arms of the type shown in FIG. 2; and, FIG. 9 is a representation of another system for controlling the extensibility of a pair of arms of the type shown in FIG. 2.

In a further embodiment of the control means, depicted in FIG. 9, the inflatable bags of the two arms 22 and 24 are connected through conduits 114, 116, 118 and 120 to a source of pressurized fluid 121, which suitably may be a pressurized water tank located in the trailer. An electrically controlled throttle valve 123 is disposed in conduit 120 for controlling the flow of pressurized fluid to the inflatable bags of the arms 22 and 24. This valve is connected by means of an electrical lead 122 to one terminal 124 of a double throw switch 126 located in the cab of the tow vehicle. The pole 128 of the switch 126 is connected to the positive terminal of a battery 130 of the tow vehicle, the other terminal of the battery being grounded. To admit pressurized fluid from the source 121 to the bags in the arms 22 and 24, the operator closes switch 126 which opens valve 123 to the selected extend to permit the pressurized fluid to flow from the source to the bags. In this depicted embodiment, conduit 118 is provided with a second electrically controlled throttle valve 132 adapted to serve as an exhaust port for pressurized fluid in the bags. This further valve 132 is connected by means of an electrical lead 134 to the second terminal 136 of switch 126. Actuation of the valve 132 is effected by the operator opening and closing the switch 126 in the cab of the vehicle. From the foregoing description of the embodiment depicted in FIG. 9, it will be recognized that when valve 132 is closed and valve 123 is opened, pressurized fluid will flow from the source 121 through conduit 120, 118, 114 and 116 to the inflatable bags in the arms 22 and 24 to inflate the bags, causing them to press the friction shoes of the arms into frictional engagement with the forward sections of the telescoping arms to restrain telescoping of the arms and thereby provide resistance to sway of the trailer with respect to the tow vehicle. The degree of sway control provided is determined by the volume of pressurized fluid which is allowed to flow to the inflatable bags. This volume of flow is controlled by the valve 123 so that the operator at all times has at his command the ability to increase the rigidity of the arms 22 and 24 up to a maximum by controlling the opening the valve 123. When it is desired to decrease the rigidity of the arms 22 and 24, the operator may do so by opening the second valve 132 to permit a portion or all of the pressurized fluid in the inflatable bags to flow out of the conduit 118 thereby deflating the bags. Actuation of the valves 123 and 132 is effected by the operator from his position in the cab of the tow vehicle through the operation of the switch 126. It is to be recognized that the volume of each of the inflatable bags in each of the arms 22 and 24 is purposely kept to a minimum so that a relatively small amount of pressurized fluid, such as water from the common pressurized water storage facility of a trailer, may be used to inflate the bags. Such a source of pressurized fluid will provide the necessary volume of fluid for extended periods of sway control operation. Other sources of pressurized fluid will be apparent to one skilled in the art.

In one example of the present sway control, a trailer weighing approximately 7,000 pounds was connected by means of a conventional ball trailer hitch to the approximate center of the rear end of a tow vehicle weighing approximately 5,800 pounds. The ball hitch was located 63 inches rearwardly from the axle of the tow vehicle. The trailer was 27 feet long. A pair of interconnecting arms of the type disclosed herein were connected at one of their ends to the two vehicle at points located 20 inches laterally from and on opposite sides of the ball hitch. The opposite ends of the arms were attached to the trailer frame.

The rear section of each of the telescoping arms was 16 inches long, and of a square cross section having a dimension of 2 ½ inches along each of its sides. In this particular example, each of the telescoping sections of the arm was of aircraft grade aluminum tubing, e.g. 2024T4 aluminum alloy, having ⅛ inch thick walls. The forward tubular section was of like grade aluminum tubing having a ⅛ inch wall thickness having dimensions of 1 ½ inches along each of its sides, When viewed in cross section. This forward section was 46 inches long and was slidably received within the rear section such that at all times there was a portion of the forward section disposed within the full length of the rear section.

That portion of the forward telescoping section disposed within the rear section was cradled between a pair of friction shoes formed from automobile brake lining type material. An inflatable rubber bag was disposed between the top friction shoe and the upper inner wall of the rear telescoping section. Inflation of the rubber bag was accomplished by admitting pressurized water from the pressurized water supply of the trailer through appropriate valves and conduits to the interior of the bag. In this example, there were approximately 96 square inches of area of contact between the two friction shoes and the side panels of that portion of the forward telescoping section disposed within the rear section. The maximum pressure in the trailer water supply system was 15 psi. This combination of pressurized fluid and area of contact between the friction shoes and the forward telescoping section was found to be sufficient to effectively prevent telescoping of the forward and rear sections, hence control trailer sway, under the maximum conditions of stress encountered during normal driving situations.

In the present example, the volume of water admitted to the inflatable rubber bag was controlled by opening a valve between the pressurized water supply and the inflatable bags to admit the desired volume of water to the bags so that the pressure in the bag varied between 0 and 15 psi for effecting the necessary frictional engagement between the friction shoes and the encompassed portion of the forward telescoping section. Deflation of the bag was accomplished, after closing the valve to the atmosphere for exhausting the water within the system.

In FIGS. 10 and 11 there is shown a further embodiment incorporating various features of the present invention. In this depicted embodiment a forward telescoping section 150 is slidably received within a rear telescoping section 152. That portion of the forward telescoping section disposed with the rear telescoping section is separated therefrom by means of a pair of elongated friction shoes 154 and 156. In this embodiment, the rear telescoping section 152 is formed from a top portion 158 and a bottom portion 160. The friction shoe 154 is nested in the top portion 158 of the rear telescoping section and the friction shoe 156 is similarly nested in the bottom portion 160 of the rear telescoping section. These two portions 158 and 160, along with their respective friction shoe members are separated from each other by a horizontal gap 162 on one side of the arm 22' and a further horizontal gap 164 on the opposite side of the arm. Thus, these two portions of the rear telescoping section are movable toward each other to urge the friction shoes 154 and 156 into frictional engagement with the outer surface 166 of the forward telescoping section disposed between the shoes.

The top portion 158 of the rear telescoping section has attached thereto preferably near one of the ends of the portion 155, an elongated member 170 extending laterally of the top portion 158 on both sides thereof. A further like elongated plate 172 is provided near the opposite end of the top portion 158. Each end of the bottom portion 160 of the rear telescoping section has a pair of lugs 174 and 176, one on each of the opposite sides of the section, extending therefrom and in vertical alignment with the ends 178 and 180 of the elongated member, for example. A rod 182 is passed through an opening in the end 178 of the elongated member 170 and extends downwardly to be anchored at its end 184 to the lug 174 on the bottom portion 160. Above the elongated member 170, a coil spring 186 is threaded over the rod 182 with its bottom end bearing against the top surface 188 of the elongated member 170. The upper end 190 of the rod 182 is threaded to receive a wing nut 192 suitable to compress the spring 186 when the nut is tightened on the rod 182 and thereby increase the force with which the spring, acting through the rod 182 urges the top and bottom portions of the rear telescoping section toward each other. The opposite side of the bottom portion 160 is similarly attached to the end 180 of the elongated member 170. By this means, one end of the bottom portion 160 of the rear telescoping section 152 is movably secured with respect to the top portion 158 of the section 152. As noted above, the opposite end of the bottom portion 160 is similarly mounted with respect to the top portion 158. It will be recognized that tightening of the wing nuts 192 and 192' against the spring 186 and 186' will serve to urge one of the ends of the top and bottom sections 158 and 160 of the rear telescoping section 152 toward each other thereby urging the friction shoes 154 and 156 into frictional engagement with that portion of the forward telescoping section 150 encompassed by the shoes. The other of the ends of the top and bottom portions 158 and 160 are likewise urged together.

A vacuum device 196 is provided to controllably move the top and bottom portions of the rear telescoping section apart from each other to reduce the frictional engagement of the friction shoes 154 and 156 with the encompassed portion of the forward telescoping section. In the depicted embodiment this vacuum device comprises a first plate 198 preferably secured to the top edge 200 of the top portion 158 of the rear telescoping section 152 in a horizontal position. A like-sized second plate 202 is disposed above and substantially parallel to the first plate and is joined at its peripheral edges to the like peripheral edges of the first plate 198 by means of an expandable bellows 204. Conduit means 206 is provided for fluid communication to the interior of the bellows 204. The second plate 202 is fixed at one of its sides to one of the ends of a pair of rod members 208 and 210 disposed on one side of the arm 22'. The opposite ends of these rods are secured to respective lugs 212 and 214 extending from the side of the bottom portion 160 of the rear telescoping section 152. A like pair of rods is provided on the opposite side of the arm 22' to connect the opposite side of the plate 202 to the bottom portion 160 so that when the bellows 204 is compressed as by the pulling of a vacuum within the bellows through the conduit 206, the rigid rods force the bottom portion 160 of the rear telescoping 152 away from the top portion of the rear telescoping section. This action reduces the frictional engagement of the shoes 154 and 156 with the encompassed portion of the forward telescoping section.

The contraction of the expandable bellows 204 by developing a vacuum within the bellows is controllable using substantially the same control means depicted in FIG. 8 except the pressurized air supply would be a source of vacuum, such as the intake manifold of the tow vehicle, and the flow pattern would be changed in an obvious manner.

The embodiment shown in FIGS. 10 and 11, in conjuncction with the control system of FIG. 8 as modified in the manner referred to above, provides a further means for remotely controlling the extensibility of the arms 22 and 24 that interconnect the trailer and its tow vehicle, thereby controlling sway of the trailer to the degree selected by the operator of the tow vehicle from his position in the tow vehicle.

While a preferred embodiment has been shown and described, it will be understood that there is no intent to limit the invention by such disclosure, but rather, it is intended to cover all modifications and alternate constructions falling within the spirit and scope of the invention as defined in the appended claims. For example, the control over the degree of restraint can be automated and made proportional to the vehicle speed by extracting a signal from the tow vehicle speedometer cable using conventional apparatus to provide a signal for operation of a conventional electropneumatic transducer adapted to control the pressure within the bags in the arms.

What is claimed is:

1. In combination with a tow vehicle having a longitudinal axis aligned with the normal direction of forward motion thereof and a trailer having a longitudinal axis aligned with the normal direction of forward motion thereof which is connected to the tow vehicle for towing employing a hitch providing for pivotal movement of said trailer relative to said tow vehicle about an upright axis coincident with said hitch, the improvement comprising means interconnecting said tow vehicle and said trailer on each of the opposite sides of said hitch, said means including a first elongated section defining a bore and having one of its ends anchored to said trailer at a location disposed on one side of an imaginary line extending substantially parallel to said longitudinal axes of said tow vehicle and said trailer and passing through said hitch, a second elongated section, telescopically received in said first section, one end of said second section being pivotally anchored to said tow vehicle at a location laterally of said hitch and on the same side of said imaginary line as said anchored end of said first section, friction means disposed within said bore of said first section and about a substantial portion of the circumference of that part of said second section received in said bore, expandable diaphragm means adapted to urge said friction means toward the outer wall of said second section to increase the resistance of telescopic movement between said first and second sections, and means disposed in said tow vehicle remotely from said expandable diaphragm means and adapted to controllably expand said expandable means for selecting the degree of resistance to telescopic movement between said first and second sections.

2. The improvement of claim 1 wherein said expandable means comprises an elongated resilient bag adapted to be expanded by the introduction of a fluid thereto.

3. The improvement of claim 1 wherein said friction means comprises at least two elongated shoes encompassing a major part, but less than all, of the girth of that part of said second section disposed within said first section whereby said portions of said friction means are free to move radially with respect to said second section.

4. The improvement of claim 1 and including a source of pressurized fluid connected to said expandable member whereby introduction of said fluid to said expandable member expands the same and urges it into engagement with said friction means.

5. The improvement of claim 1 wherein said expandable means is disposed within said bore and between said friction means and the interior wall of said first elongated section.

6. The improvement of claim 1 wherein said first section comprises a plurality of aligned members defining a bore, said expandable means is disposed exteriorly of said first section, and including means connecting said expandable means to said aligned members for controlled movement of said members relative to each other in response to the expansion and contraction of said expandable means.

7. A sway control device adapted for interconnection between a trailer and its tow vehicle and for regulating the degree of sway control exerted between said trailer and its tow vehicle comprising
- a first elongated tubular member of substantially square cross section,
- a second elongated hollow tubular member of substantially square cross section adapted to receive in the bore thereof said first tubular member in sliding engagement therewith,
- friction means disposed within the bore of said second tubular means and substantially encompassing that portion of said first tubular means disposed in the bore of said second tubular means, said friction means frictionally engaging at least two adjacent internal side walls of said second tubular member,
- elongated expandable bag means interposed between the other two internal walls of said second tubular member and said friction means,
- a source of pressurized fluid connected to said bag means,
- control means located in said tow vehicle remotely from said sway control device for regulating the introduction of pressurized fluid to said bag means for expansion thereof, hence regulating the degree of frictional engagment between said first and second tubular members, whereby telescopic movement between said tubular members is controlled and the degree of rigidity of the interconnection of said trailer to said tow vehicle is selectable.

8. The sway control device of claim 7 wherein said first and second tubular members are oriented with two of the opposite apices of their respective cross section in vertical alignment.

* * * * *